(No Model.)
J. A. LEWIS & W. G. SPIEGEL.
TIRE FOR VEHICLE WHEELS.
No. 589,662. Patented Sept. 7, 1897.
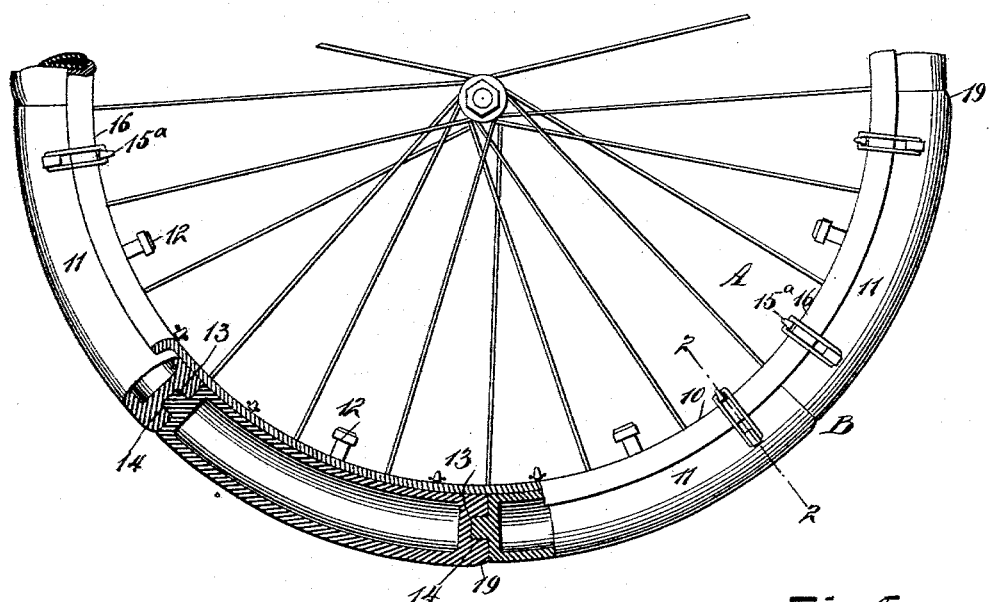
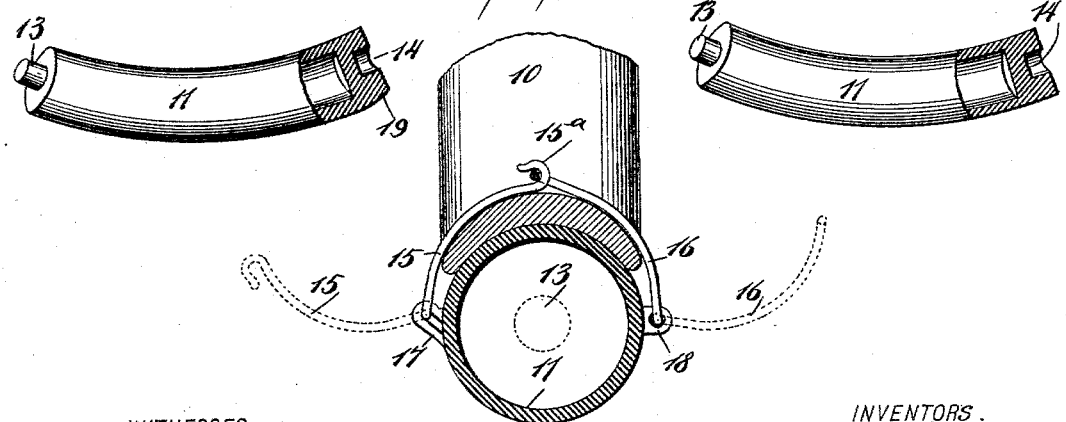
WITNESSES:
William P. Goebel.
INVENTORS
J. A. Lewis.
W. G. Spiegel.
BY
ATTORNEYS.

UNITED STATES PATENT OFFICE.

JACOB A. LEWIS AND WILLIAM G. SPIEGEL, OF NEW YORK, N. Y.

TIRE FOR VEHICLE-WHEELS.

SPECIFICATION forming part of Letters Patent No. 589,662, dated September 7, 1897.

Application filed June 8, 1897. Serial No. 639,845. (No model.)

*To all whom it may concern:*

Be it known that we, JACOB A. LEWIS and WILLIAM G. SPIEGEL, of New York city, in the county and State of New York, have invented a new and Improved Tire for Vehicle-Wheels, of which the following is a full, clear, and exact description.

The object of our invention is to provide a tire for bicycles or an inflated tire for any vehicle-wheel to which such a tire is applicable and to so construct said tire that while inflatable it will be made in independent sections, each section being capable of being independently inflated.

A further object of the invention is to provide a means whereby the sections of the tire may be firmly held upon the rim of the wheel, one in engagement with the other, so as to form in effect a continuous tire or a continuous tread-surface for a tire.

Another object of the invention is to so construct the tire that its tread-surface may be stepped to a greater or a less degree, one section projecting at the tread-surface slightly beyond the abutting end of an adjacent section.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a portion of a wheel having the improved tire applied, parts of the tire being in longitudinal section. Fig. 2 is a transverse section on the line 2 2 of Fig. 1. Fig. 3 is a detail view of one of the sections, a portion of one end being broken away; and Fig. 4 is a view similar to Fig. 3, being a section in a slightly-modified form.

The wheel A may be of any approved type and is shown as provided with the ordinary concaved rim 10. The tire B is made up of a number of sections or segments 11, each being tubular and each being adapted to be inflated by an independent valve 12 of any description. The segments or sections of the tire may be joined together in different ways, the preferred manner of connection being shown in the drawings, wherein each segment of the tire is provided at one end with a stud or a lip 13 and at the other end with a corresponding depression 14, adapted to receive the stud of an abutting segment. When the segments of the tire are connected in this manner, the tire will have the same continuous appearance as when made in the ordinary manner. Each segment of the tire is independently attached to the rim of the wheel. This attachment may be made through the medium of any suitable form of clamping or fastening device, one form of which is shown particularly in Fig. 2, in which a curved lever 15, provided with a hook 15$^a$, is attached to one side of a section of the tire and a curved link 16 is attached to the opposite side of the same section, ears 17 and 18, which may be made of the same material, being provided as the connecting medium between the sections of the tire, the levers, and links.

Ordinarily the fastening devices shown or other substitutes that may be employed will be sufficient to hold the sections of the tire in position on the rim of the wheel, but the sections may be cemented or otherwise additionally secured to the rim if required.

In Figs. 1 and 3 the segments or sections of the tire are shown as of greater diameter at one end than at the other, and the tread-surface at the larger ends is rounded off, as shown at 19 in Fig. 3, but the segments or sections of the tire may be of the same diameter throughout their body portions, as shown in Fig. 4. When the segments are of the same diameter throughout, the tread-surface of the complete tire will be perfectly smooth, presenting the same appearance as the ordinary one-piece tire, but when the segments are larger at one end than at the other the smaller end of one segment is made to engage with the larger end of the next segment, and under this construction, as shown in Fig. 1, a stepped appearance is given to the tire in its entirety, which, it is thought, assists the wheel in revolving and decreases the labor of the rider. The studs or lips of one section are made to enter the depressions 14 of the adjoining sections, and while the sections are deflated or collapsed the links or levers are carried over the rim and made to interlock, as shown in Figs. 1 and 2. The sections of the tire are then inflated and the expansion of the tire-sections will tend to cause the fastening devices to tightly bind the said sections to the rim.

We desire it to be understood that if desired the tubular sections of the tire may be smooth at each end and the ends of the adjoining sections simply made to abut.

It is obvious that by constructing the tire in the manner set forth all the advantages of the ordinary tire are retained, but in the event of a puncture it is necessary only to remove the section in which the puncture is made and substitute another section, whereas in the ordinary tire when the puncture cannot be healed the injured tire must be replaced by an entire new tire.

Having thus described our invention, we claim as new and desire to secure by Letters Patent—

1. An inflatable tire constructed in sections arranged for interlocking engagement, each section being provided with an independent fastening device and an independent inflating device, and tapered longitudinally with its wider end abruptly rounded off, whereby a stepped appearance is given to the tire, as and for the purpose set forth.

2. An inflatable tire constructed of interlocking sections or segments, each section being tapered longitudinally and having its tread-surface at its larger end rounded off, as and for the purpose set forth.

3. An inflatable tire constructed in sections, each section being provided at one end with a lip 13 and at the other end with a recess 14 arranged to receive the lip of an adjacent section, each section being also provided with oppositely-located ears 17 and 18 and inelastic lever 15 and link 16 arranged to interlock over the rim of the wheel, as and for the purpose set forth.

4. An inflatable tire for bicycle and other vehicle wheels, the same being constructed in sections, each section being provided with a valve and having its ends formed with a lip and a recess arranged to receive the lip of an abutting section, each section tapering longitudinally and having its larger end abruptly rounded off, whereby a stepped appearance is given to the complete tire, and an inelastic lever and hook attached to each section and arranged to interlock over the rim of the wheel, as and for the purpose set forth.

JACOB A. LEWIS.
WILLIAM G. SPIEGEL.

Witnesses:
J. FRED. ACKER,
EVERARD BOLTON MARSHALL.